US008643607B2

(12) United States Patent
Suzuki et al.

(10) Patent No.: US 8,643,607 B2
(45) Date of Patent: Feb. 4, 2014

(54) TOUCH PANEL AND MANUFACTURING METHOD OF THE SAME

(75) Inventors: Hisao Suzuki, Miyagi (JP); Yoshiaki Imamura, Miyagi (JP); Kiyohiro Kimura, Miyagi (JP)

(73) Assignee: Sony Corporation, Tokyo (JP)

( * ) Notice: Subject to any disclaimer, the term of this patent is extended or adjusted under 35 U.S.C. 154(b) by 675 days.

(21) Appl. No.: 12/424,331

(22) Filed: Apr. 15, 2009

(65) Prior Publication Data

US 2009/0267913 A1   Oct. 29, 2009

(30) Foreign Application Priority Data

Apr. 25, 2008 (JP) ................................ 2008-116076

(51) Int. Cl.
*G06F 3/0488* (2013.01)
(52) U.S. Cl.
USPC .......................................... 345/173; 345/174
(58) Field of Classification Search
USPC ............................................................ 345/173
See application file for complete search history.

(56) References Cited

U.S. PATENT DOCUMENTS

| 6,297,811 | B1 * | 10/2001 | Kent et al. ..................... 345/173 |
| 6,549,193 | B1 * | 4/2003 | Huang et al. .................. 345/173 |
| 8,121,283 | B2 * | 2/2012 | Peng et al. ............... 379/433.07 |
| 2002/0000979 | A1 * | 1/2002 | Furuhashi et al. ............ 345/173 |
| 2003/0011575 | A1 | 1/2003 | Matsuda et al. |
| 2003/0201985 | A1 * | 10/2003 | Katakami ..................... 345/173 |

FOREIGN PATENT DOCUMENTS

JP       2002-021332       1/2002

* cited by examiner

*Primary Examiner* — Alexander S Beck
*Assistant Examiner* — James M Holland
(74) *Attorney, Agent, or Firm* — K&L Gates LLP

(57) ABSTRACT

A touch panel includes a first support, a second support, a first resistive layer formed on the first support, a second resistive layer formed on the second support, a first conductor pattern including a first electrode portion that extends in a first direction, and a first end portion and a second end portion opposite thereto, a second conductor pattern including a second electrode portion that extends in a second direction that intersects with the first direction, and a first end portion and a second end portion opposite thereto, a first structure layer that is formed on the first resistive layer adjacently to the first end portion of the first conductor pattern, and has a thickness that is gradually reduced in proportion to a distance from the first end portion, and a bonding layer including a first bonding surface and a second bonding surface.

21 Claims, 12 Drawing Sheets

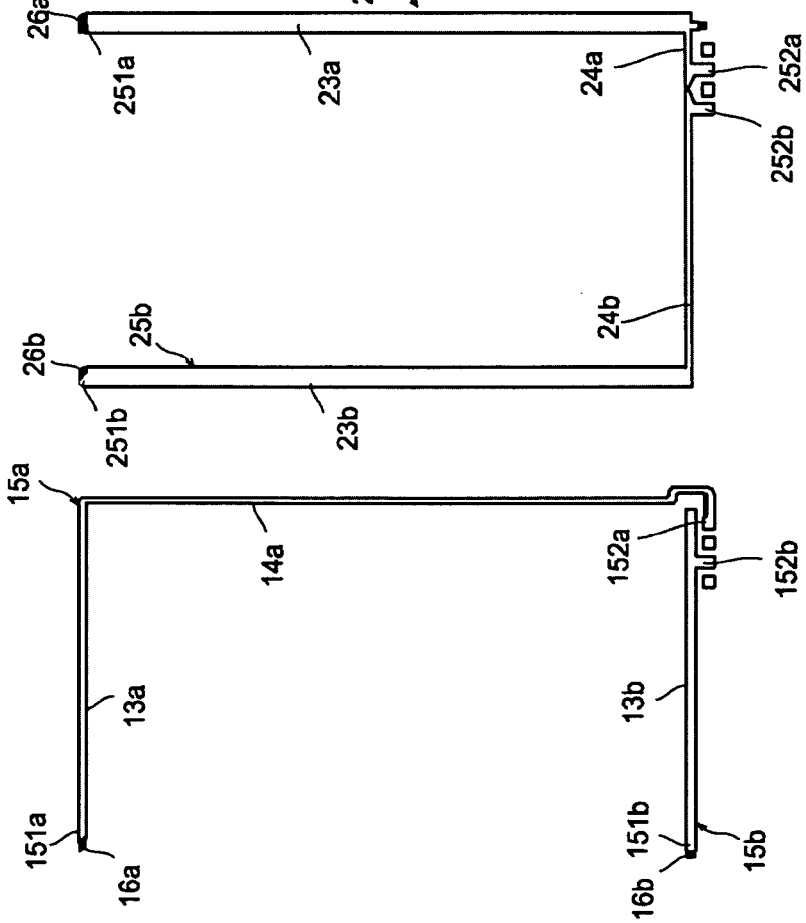

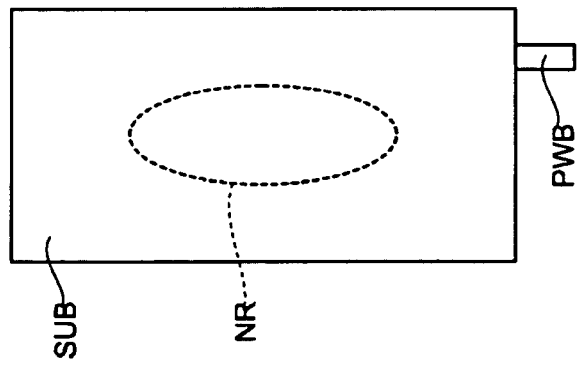
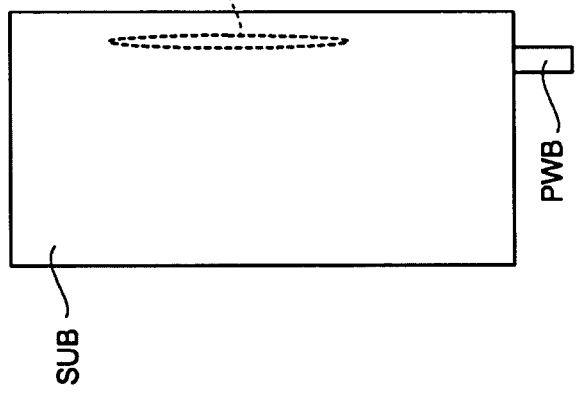
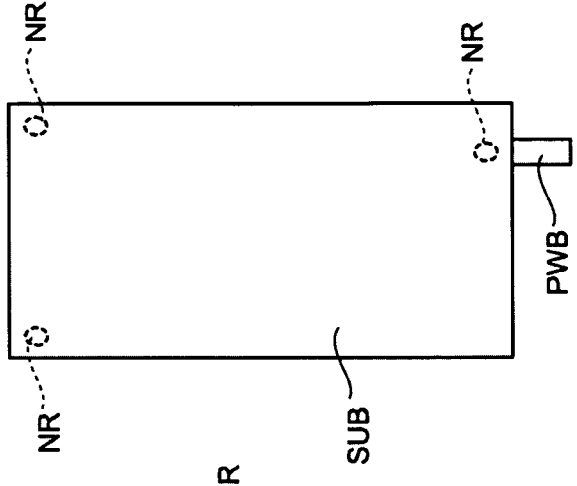

TOUCH PANEL AND MANUFACTURING METHOD OF THE SAME

CROSS REFERENCES TO RELATED APPLICATIONS

The present application claims priority to that disclosed in Japanese Priority Patent Application JP 2008-116076 filed in the Japan Patent Office on Apr. 25, 2008, the entire contents of which is hereby incorporated by reference.

BACKGROUND

The present disclosure relates to a touch panel used for a screen input/display apparatus and the like, and a manufacturing method of the same.

A touch panel of an analog resistive type that detects input coordinates based on an amount of resistance change has been known (see, for example, Japanese Patent Application Laid-open No. 2002-215332). Japanese Patent Application Laid-open No. 2002-215332 discloses a touch panel including a fixed panel, a movable panel, and a double-sided tape for bonding the panels with a certain gap formed between the panels.

Inside of each of the fixed panel and the movable panel, an ITO conductive film is formed. On the conductive film, a pair of electrodes disposed so as to be opposed in a direction is formed for the fixed panel, and a pair of electrodes disposed so as to be opposed in a direction perpendicular to the above-mentioned direction is formed for the movable panel. The double-sided tape is located between the electrodes of each of the fixed panel and the movable panel, to electrically insulate the electrodes.

In the touch panel having the above structure, respective electrodes of the fixed side panel and the movable panel are covered with the double-sided tape. Meanwhile, the respective electrodes are each formed to have a predetermined thickness on the conductive film. Therefore, at a position of an end portion or a periphery portion of each electrode, a difference in level between a surface of the electrode and a surface of the conductive film is not absorbed due to adhesive surfaces of the double-sided tape, which causes gaps.

When the gaps have a predetermined size or more, a slight pressure difference generated between the inside and the outside of the touch panel causes the movable panel to sag inwards, which causes an interference fringe known as a Newton ring to easily occur. As a result, an appearance of the touch panel is impaired, or visibility of an image displayed through the touch panel becomes poor.

In view of the above-mentioned circumstances, it is desirable to provide a touch panel that is capable of suppressing the occurrence of the Newton ring due to the pressure difference.

SUMMARY

According to an embodiment, there is provided a touch panel including a first support that is transparent, a second support that is transparent, a first resistive layer formed on the first support, a second resistive layer formed on the second support, a first conductor pattern, a second conductor pattern, a first structure layer, and a bonding layer. The first conductor pattern includes a first electrode portion that extends in a first direction, and a first end portion and a second end portion opposite thereto. The second conductor pattern is formed on the first resistive layer. The second conductor pattern includes a second electrode portion that extends in a second direction that intersects with the first direction, and a first end portion and a second end portion opposite thereto. The second conductor pattern is formed on the second resistive layer. The first structure layer is formed on the first resistive layer adjacently to the first end portion of the first conductor pattern, and has a thickness that is gradually reduced in proportion to a distance from the first end portion. The bonding layer includes a first bonding surface that covers the first conductor pattern and the first structure layer and a second bonding surface that covers the second conductor pattern.

In the touch panel having the above-mentioned structure, the first structure layer is formed adjacently to the first end portion of the first conductor pattern so as to have a thickness that is gradually reduced in proportion to the distance from the first end portion. Accordingly, a difference in level between a surface of the conductor pattern and a surface of the first resistive layer, which may be caused on the first end portion side of the first conductor pattern is decreased by the first structure layer. As a result, a gap between the first resistive layer and the bonding layer at the first end portion of the first conductor pattern can be effectively decreased by the first structure layer.

Thus, the touch panel may make it possible to prevent air from freely passing through the gap, and reduce a change in inner pressure of the touch panel along with a pressure variation of the outside. As a result, it is possible to suppress an occurrence of a Newton ring on the surface of the touch panel due to the pressure difference between the inside and the outside of the touch panel.

The first end portion of the first conductor pattern is located on a side of the first electrode portion.

With this structure, on the first end portion side of the first conductor pattern, it is possible to effectively prevent air from freely passing between the inside and the outside of the touch panel. In this case, the first structure layer may be formed along the first direction from the first end portion.

The first structure layer may be made of the same material as the first conductor pattern.

With this structure, it is possible to form the first structure at the same time when the first conductor pattern is formed.

The first structure layer is capable of being formed of a gradation printed layer, a formation area of which is gradually reduced in proportion to a distance from the first end portion of the first conductor pattern.

With this structure, it is possible to form the first conductor pattern and the first structure layer through the same printing process.

The first structure layer may be constituted of a plurality of structures that are intermittently formed from the first end portion of the first conductor pattern, or may be continuously formed from the first end portion of the first conductor pattern.

The touch panel described above may further includes a second structure layer that is formed on the second resistive layer adjacently to the first end portion of the second conductor pattern, and has a thickness that is gradually reduced in proportion to a distance from the first end portion.

By using the touch panel, a difference in level between a surface of the conductor pattern and a surface of the second resistive layer, which may be caused on the first end portion side of the second conductor pattern is decreased by the second structure layer. As a result, a gap between the second resistive layer and the bonding layer at the first end portion of the second conductor pattern can be effectively decreased by the second structure layer.

The first end portion of the second conductor pattern is located on a side of the second electrode portion.

With this structure, on the first end portion side of the second conductor pattern, it is possible to effectively prevent air from freely passing through the gap between the inside and the outside of the touch panel. In this case, the second structure layer can be formed along the second direction from the first end portion of the second conductor pattern.

The first structure layer and the second structure layer may be opposed with respect to the bonding layer.

With this structure, at a portion where the first end portion of the first conductor pattern and the first end portion of the second conductor pattern approach each other, it is possible to effectively prevent air from passing between the inside and the outside of the touch panel.

The touch panel described above may further include a third structure layer that is formed on the first resistive layer adjacently to the second end portion of the first conductor pattern, and has a thickness that is gradually changed.

By using the touch panel, a difference in level between a surface of the conductor pattern and the surface of the first resistive layer, which may be caused on the second end portion side of the first conductor pattern is decreased by the third structure layer. As a result, a gap between the first resistive layer and the bonding layer at the second end portion of the first conductor pattern can be effectively decreased by the third structure layer.

The touch panel according may further includes a fourth structure layer that is formed on the second resistive layer adjacently to the second end portion of the second conductor pattern, and has a thickness that is gradually changed.

By using the touch panel, a difference in level between the surface of the conductor pattern and the surface of the second resistive layer, which may be caused on the second end portion side of the second conductor pattern is decreased by the fourth structure layer. As a result, a gap between the second resistive layer and the bonding layer at the second end portion of the second conductor pattern can be effectively decreased by the fourth structure layer.

The touch panel may further includes a wiring substrate that is connected to the second end portion of the first conductor pattern and to the second end portion of the second conductor pattern.

With this structure, the first conductor pattern and the second conductor pattern of the touch panel can be connected to an external power supply circuit through the wiring substrate.

In the touch panel described above, the first end portion of the first conductor pattern is located on an opposite side to the first electrode.

With this structure, on the first end portion side of the first conductor pattern, it is possible to effectively prevent air from passing between the inside and the outside of the touch panel.

According to another embodiment, there is provided a manufacturing method of a touch panel. The manufacturing method includes forming a first resistive layer on a first support that is transparent, forming a second resistive layer on a second support that is transparent, forming, on the first resistive layer by a screen printing method, a first conductor pattern including an electrode portion that extends in a first direction, and a first structure layer that is formed adjacently to a first end portion on one side of the first conductor pattern, and has a thickness that is gradually reduced in proportion to a distance from the first end portion, forming, on the second resistive layer by the screen printing method, a second conductor pattern including a second electrode portion that extends in a second direction that intersects with the first direction, and bonding the first support and the second support with each other by bonding a bonding layer between the first conductor pattern and the second conductor pattern such that the first structure layer is covered.

The manufacturing method of a touch panel includes the step of forming the first structure layer whose thickness is gradually reduced in proportion to the distance from the first end portion, adjacently to the first end portion of the first conductor pattern. Accordingly, a difference in level between a surface of the conductor pattern and a surface of the first resistive layer, which may be caused on the first end portion side of the first conductor pattern is decreased by the first structure layer. As a result, a gap between the first resistive layer and the bonding layer at the first end portion of the first conductor pattern can be effectively decreased by the first structure layer.

Thus, the touch panel may make it possible to prevent air from freely passing through the gap, and reduce a change in inner pressure of the touch panel along with a pressure variation of the outside. As a result, it is possible to suppress an occurrence of a Newton ring on the surface of the touch panel due to the pressure difference between the inside and the outside of the touch panel.

The first stricture layer can be formed by reducing a formation area thereof in proportion to the distance from the first end portion of the first conductor pattern.

Thus, the first structure layer can be easily formed.

The manufacturing method of a touch panel may further includes forming, when forming of the second conductor pattern, a second structure layer on the second resistive layer by the screen printing method so that the second structure layer is adjacent to a first end portion on one side of the second conductor pattern and has a thickness that is gradually reduced in proportion to a distance from the first end portion.

By the manufacturing method of a touch panel, a difference in level between a surface of the conductor pattern and a surface of the second resistive layer, which may be caused on the first end portion side of the second conductor pattern is decreased by the second structure layer. As a result, a gap between the second resistive layer and the bonding layer at the first end portion of the second conductor pattern can be effectively decreased by the second structure layer.

The manufacturing method of a touch panel may further includes forming, when forming of the first conductor pattern, a third structure layer on the first resistive layer by the screen printing method so that the third structure layer is adjacent to the second end portion on the other side of the first conductor pattern and has a thickness that is gradually changed.

By the manufacturing method of a touch panel, a difference in level between a surface of the conductor pattern and the surface of the first resistive layer, which may be caused on the second end portion side of the first conductor pattern is decreased by the third structure layer. As a result, a gap between the first resistive layer and the bonding layer at the second end portion of the first conductor pattern can be effectively decreased by the third structure layer.

The manufacturing method of a touch panel further includes forming, when forming of the second conductor pattern, a fourth structure layer on the second resistive layer by the screen printing method so that the fourth structure layer is adjacent to the second end portion on the other side of the second conductor pattern and has a thickness that is gradually changed.

By the manufacturing method of a touch panel, a difference in level between the surface of the conductor pattern and the surface of the second resistive layer, which may be caused on the second end portion side of the second conductor pattern is decreased by the fourth structure layer. As a result, a gap between the second resistive layer and the bonding layer at the second end portion of the second conductor pattern can be effectively decreased by the fourth structure layer.

As described above, according to the embodiments, the occurrence of the Newton ring due to the pressure difference between the inside and the outside of the touch panel can be suppressed.

Additional features and advantages are described herein, and will be apparent from the following Detailed Description and the figures.

BRIEF DESCRIPTION OF THE FIGURES

FIGS. 3A and 3B are schematic views each showing a first structure layer that structures the touch panel of FIG. 1, in which FIG. 3A is a plan view thereof, and FIG. 3B is a side view thereof;

FIGS. 5A to 5C are plan views showing various printing patterns including conductor patterns for structuring the touch panel of FIG. 1, in which FIG. 5A shows a state on an upper substrate side, FIG. 5B shows a state on a lower substrate side, and FIG. 5C shows a state where the conductor patterns shown in FIGS. 5A and 5B are superimposed;

FIGS. 12A to 12C are schematic views each showing a representative form of a Newton ring that may occur on a surface of a touch panel.

DETAILED DESCRIPTION

Hereinafter, an embodiment will be described with reference to the drawings.

Figure 1:
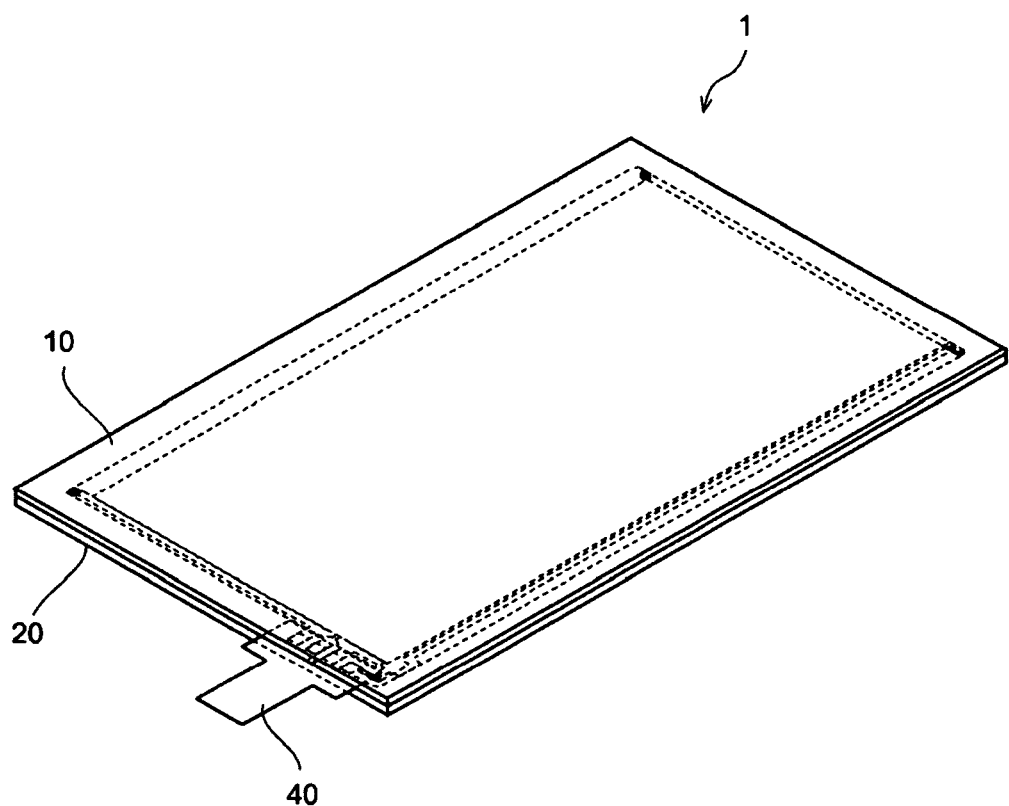
FIG. 1 is an overall perspective view showing a touch panel according to an embodiment.
Figure 2:
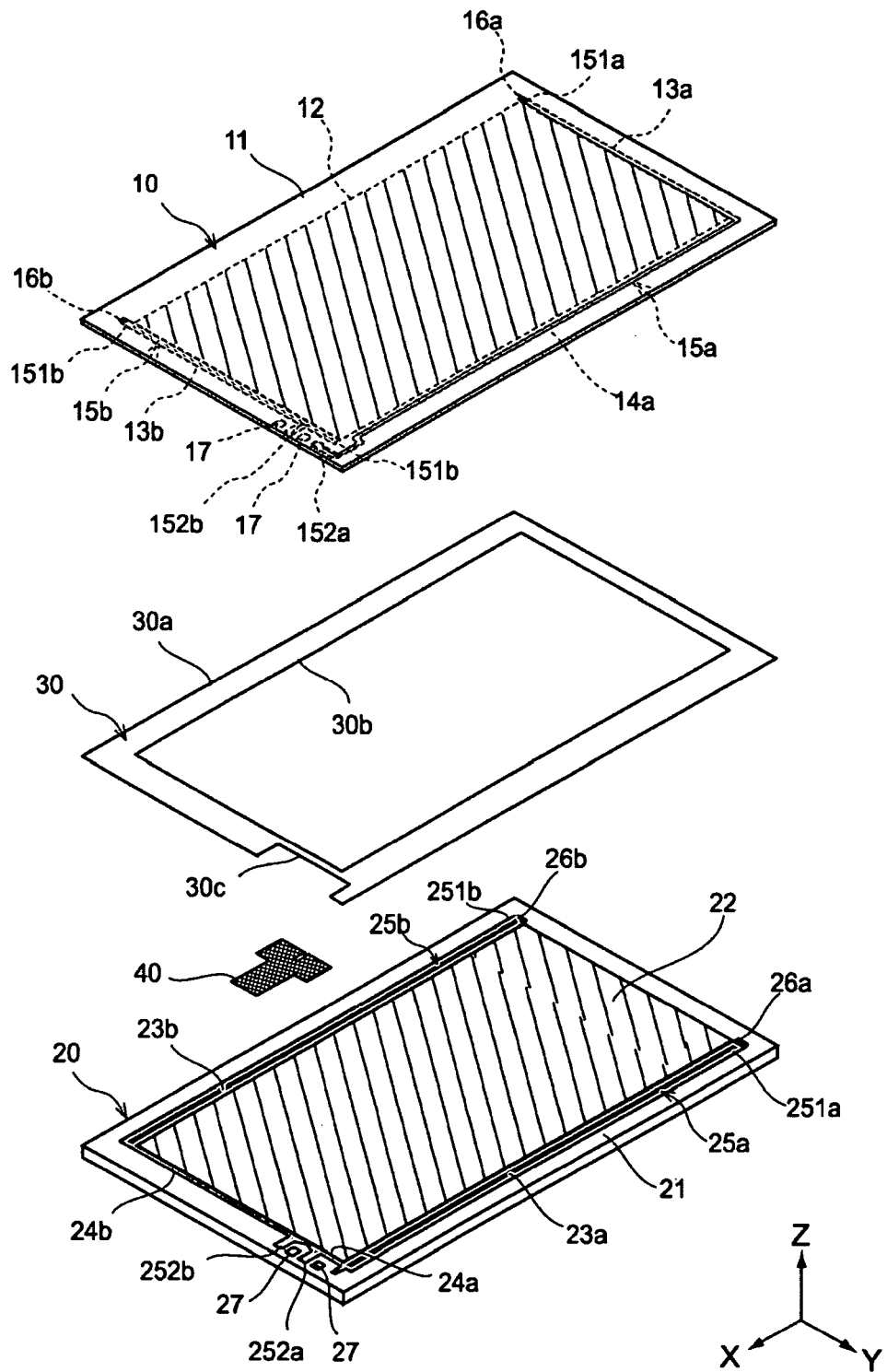
FIG. 2 is an exploded perspective view showing the touch panel of FIG. 1.

FIG. 1 is an overall perspective view showing a touch panel 1 according to this embodiment. FIG. 2 is an exploded perspective view showing the touch panel 1. The touch panel 1 has a rectangular shape. In FIG. 2, an X-axis direction indicates a long-side direction of the touch panel 1, and a Y-axis direction perpendicular to the X-axis direction indicates a short-side direction of the touch panel 1. A Z-axis direction perpendicular to the X-axis and Y-axis directions indicates a thickness direction of the touch panel 1.

[Overall Structure]

The touch panel 1 is used as a screen input/display apparatus superimposed on a display apparatus such as a liquid crystal panel and an organic EL panel. By pressing the touch panel 1, a selection or the like of a displayed object on a screen of the screen input/display apparatus is capable of being directly performed. The touch panel 1 of an analog resistive type is employed.

As shown in FIGS. 1 and 2, the touch panel 1 includes a pair of an upper substrate 10 and a lower substrate 20 each of which has a rectangular shape. The touch panel 1 further includes a double-sided tape 30 and a wiring substrate 40. The double-sided tape 30 bonds the upper substrate 10 and the lower substrate 20 with each other, and has an electrical insulation property. The wiring substrate 40 is disposed between the upper substrate 10 and the lower substrate 20.

[Upper Substrate]

The upper substrate 10 includes a transparent support 11 (first support), a transparent resistive layer 12 (first resistive layer), a first X-direction electrode portion 13a (first electrode portion), and a second X-direction electrode portion 13b (first electrode portion).

The support 11 may be made of a transparent material such as a glass substrate, a plastic plate, and a plastic film. In this embodiment, the support 11 is formed of a flexible plastic film made of soft polyethylene terephthalate (PET) and the like. The support 11 is formed into a rectangular shape having long sides in the X direction and short sides in the Y direction but is not limited to this shape. The support 11 may be formed into a square shape, for example.

The resistive layer 12 is formed of a thin film made of a transparent conductive oxide such as ITO (Indium Tin Oxide), IZO (Indium Zinc Oxide), and $SnO_2$. The resistive layer 12 may be formed by a thin film formation method such as a sputtering method and a vacuum deposition method. The resistive layer 12 may be formed on an entire surface of the support 11, or may be formed on a region between the electrode portions 13a and 13b.

The first X-direction electrode portion 13a and the second X-direction electrode portion 13b are arranged on the resistive layer 12 so that the electrode portions 13a and 13b are opposed to each other in the X-axis direction. The first X-direction electrode portion 13a is linearly formed along the Y-axis direction on one short side of the support 11. The second X-direction electrode portion 13b is linearly formed along the Y-axis direction on the other short side of the support 11. By applying a predetermined direct voltage between the electrode portions 13a and 13b, an electric field is formed in parallel to the X-axis direction within a surface of the resistive layer 12.

It should be noted that in a case where the resistive layer 12 is formed on the entire surface of the support 11, the resistive layer 12 is subjected to a pattern etching so that the electric field is formed only in an area between the electrode portions 13a and 13b which is indicated by a shaded area in FIG. 2. For the pattern etching, laser-beam lithography (trimming) may be employed, for example. Further, in order for an applied voltage to the electrode portions 13a and 13b not to leak into a peripheral portion of the touch panel 1, a peripheral portion of the resistive layer 12 is subjected to a pattern etching along a periphery of the support 11.

The first X-direction electrode portion 13a is connected to an upper wiring portion 14a that is approximately linearly formed along one long side of the support 11. The upper wiring portion 14a is used for electrically connecting the electrode portion 13a to the wiring substrate 40. The electrode portion 13a and the upper wiring portion 14a constitute a first upper conductor pattern 15a (first conductor pattern).

The first upper conductor pattern 15a includes a first end portion 151a and a second end portion 152a opposite thereto. The first end portion 151a is an open end portion positioned on the electrode portion 13a side, and the second end portion 152a has a land shape connected to the wiring substrate 40.

The second X-direction electrode portion 13b constitutes a second upper conductor pattern 15b (first conductor pattern). The second upper conductor pattern 15b includes two first end portions 151b opened and a second end portion 152b connected to the wiring substrate 40.

The upper conductor patterns 15a and 15b are formed by a print body of a conductive material. The conductive material may be formed of a conductive paste, a conductive thin film, a conductive piece, or the like. In this embodiment, the upper conductor pattern 15a and 15b are formed of print patterns of a silver paste by a screen printing method. A thickness of each upper conductor patterns 15a and 15b is about 10 µm in this embodiment, but is not particularly limited thereto.

The touch panel 1 includes on the resistive layer 12a first upper-electrode-side structure layer 16a (first structure layer) adjacent to the first end portion 151a of the first upper conductor pattern 15a. The first upper-electrode-side structure layer 16a has a thickness that is gradually reduced in proportion to a distance from the first end portion 151a of the first upper conductor pattern 15a.

The touch panel 1 also includes on the resistive layer 12a second upper-electrode-side structure layer 16b (first structure layer) adjacent to the first end portion 151b of the second upper conductor pattern 15b. The second upper-electrode-side structure layer 16b has a thickness that is gradually reduced in proportion to a distance from the first end portion 151b of the second upper conductor pattern 15b.

In this embodiment, the second upper-electrode-side structure layer 16b is formed only for one first end portion 151b that is not opposed to the upper wiring portion 14a, out of the two first end portions 151b of the second upper conductor pattern 15b. However, the second upper-electrode-side structure layer may be provided for each of the two first end portions 151b.

The upper-electrode-side structure layers 16a and 16b are formed of the same material (silver paste in this embodiment) as the upper conductor patterns 15a and 15b. Therefore, the upper-electrode-side structure layer 16a and 16b may be formed at the same time when the upper conductor patterns 15a and 15b are formed.

The first upper-electrode-side structure layer 16a is formed of a gradation printed layer whose formation area is gradually reduced in proportion to a distance from the first end portion 151a of the first upper conductor pattern 15a. The second upper-electrode-side structure layer 16b is also formed of a gradation printed layer whose formation area is gradually reduced in proportion to a distance from the first end portion 151b of the second upper conductor pattern 15b. The gradation printed layer is capable of being formed by a screen printing method. Thus, the upper-electrode-side structure layers 16a and 16b are capable of being formed by the same printing process as the upper conductor patterns 15a and 15b.

Figure 3A:
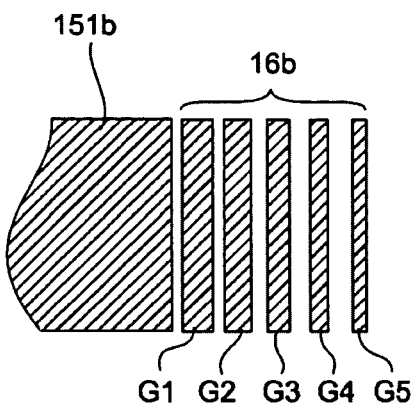

FIG. 3A is an enlarged plan view showing a structure of the second upper-electrode-side structure layer 16b. The second upper-electrode-side structure layer 16b is formed along a longitudinal direction (Y direction) of the second X-direction electrode portion 13b. In this embodiment, the second upper-electrode-side structure layer 16b is constituted of a plurality of structures G1, G2, G3, G4, and G5 that are intermittently formed from the first end portion 151b of the upper conductor pattern 15b.

Figure 3B:
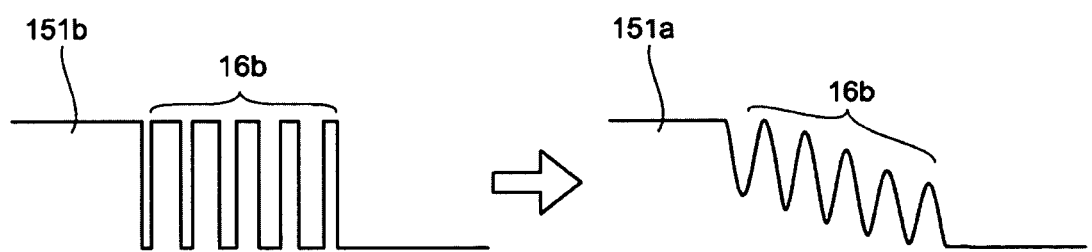

The structures G1 to G5 are each formed so as to have approximately the same width as the end portion 151b. Shapes (lengths in the Y direction) of the structures G1 to G5 are made to be gradually smaller in proportion to a distance from the end portion 151b. In addition, intervals of the structures G1 to G5 are made to be gradually longer in proportion to the distance from the end portion 151b. Generally, as shown in FIG. 3B, the structures G1 to G5 are formed in a printing pattern that provides the same height as that of the end portion 151b. However, in a case where a viscosity of a printing material (ink) is low, the smaller the formation areas of the structures, the larger the loss of the printing shape near bottom portions thereof, which causes reduction in printing heights, as shown in FIG. 3C. In this embodiment, by using features of the screen printing method as described above, the structure layer 16b whose thickness is gradually reduced in proportion to the distance from the end portion 151b is formed. A gradient of the thickness of the structure layer 16b may be controlled by appropriately adjusting a formation count of the structures, formation lengths, and formation intervals.

Figure 4A:
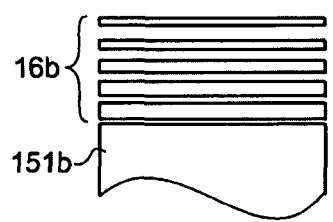
FIGS. 4A to 4F are plan views each schematically showing modified examples of the structure of the structure layer shown in FIGS. 3A and 3B.
Figure 4B:
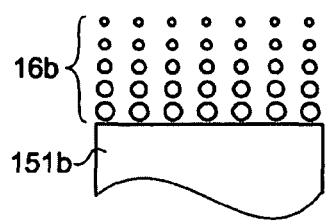
Figure 4C:
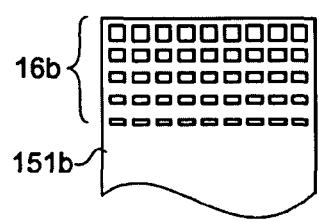
Figure 4D:
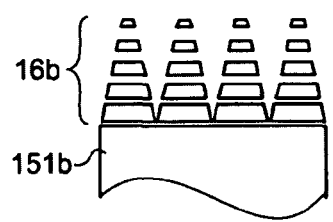
Figure 4E:
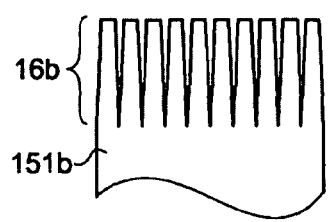
Figure 4F:
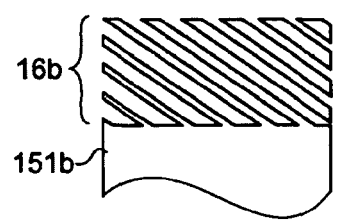

FIGS. 4A to 4F are schematic diagrams each showing another structural example of the structure layer 16b. FIG. 4A shows the same structural example as that shown in FIG. 3A. FIGS. 4A, 4B, and 4D each show another structural example of the structure layer 16b including a plurality of structures that are intermittently formed from the end portion 151b of the electrode portion 13b. FIGS. 4C, 4E, and 4F each show a structural example of the structure layer 16b continuously formed from the end portion 151b of the electrode portion 13b. In any structural example, it is possible to form a desired structure layer 16b whose thickness is gradually reduced in proportion to the distance from the end portion 151b.

The first upper-electrode-side structure layer 16a is similar to the second upper-electrode-side structure layer 16b described above in that the first and second upper-electrode-side structure layers 16a and 16b are formed along the longitudinal direction (Y direction) of the first X-direction electrode portion 13a, and they are each constituted of the plurality of structures that are intermittently formed from the first end portion 151a of the first upper conductor pattern 15a. However, the first upper-electrode-side structure layer 16a is different from the second upper-electrode-side structure layer 16b in that the structures thereof are diagonally formed toward the second upper conductor pattern 15b side. It should be noted that the other structures of the first upper-electrode-side structure layer 16a are the same as those of the second upper-electrode side structure layer 16b described above with reference to FIGS. 3 and 4, and therefore a detailed description thereof is omitted.

[Lower Substrate]

On the other hand, the lower substrate 20 includes a transparent support 21 (second support), a transparent resistive layer 22 (second resistive layer), a first Y-direction electrode portion 23a (second electrode portion), and a second Y-direction electrode portion 23b (second electrode portion).

The support 21 may be formed of a transparent material such as a glass substrate, a plastic plate, and a plastic film. In this embodiment, the support 21 is formed of a glass substrate. The support 21 has the same shape as the support 11 and is formed into a rectangular shape having long sides in the X direction and short sides in the Y direction.

The resistive layer 22 is formed of a thin film made of a transparent conductive oxide such as ITO, IZO, and $SnO_2$.

The resistive layer 22 may be formed by the thin film formation method such as the sputtering method and the vacuum deposition method. The resistive layer 22 may be formed on an entire surface of the support 21, or may be formed on a region between the electrode portions 23a and 23b.

The first Y-direction electrode portion 23a and the second Y-direction electrode portion 23b are arranged on the resistive layer 22 so that the electrode portions 23a and 23b are opposed to each other in the Y-axis direction. The first Y-direction electrode portion 23a is linearly formed along the X-axis direction on one long side of the support 21. The second Y-direction electrode portion 23b is linearly formed along the X-axis direction on the other long side of the support 21. By applying a predetermined direct voltage between the electrode portions 23a and 23b, an electric field is formed in parallel to the Y-axis direction within a surface of the resistive layer 22.

It should be noted that in a case where the resistive layer 22 is formed on the entire surface of the support 21, the resistive layer 22 is subjected to a pattern etching so that the electric field is formed only in an area between the electrode portions 23a and 23b which is indicated by a shaded area in FIG. 2. For the pattern etching, laser-beam lithography (trimming) may be employed, for example. Further, in order for a applied voltage to the electrode portions 23a and 23b not to leak into the peripheral portion of the touch panel 1, a peripheral portion of the resistive layer 22 is subjected to a pattern etching along a periphery of the support 21.

The first Y-direction electrode portion 23a is connected to a first lower wiring portion 24a that is approximately linearly formed along one short side of the support 21. The first lower wiring portion 24a is used for electrically connecting the electrode portion 23a to the wiring substrate 40. The electrode portion 23a and the wiring portion 24a constitute a first lower conductor pattern 25a (second conductor pattern).

The first lower conductor pattern 25a includes a first end portion 251a and a second end portion 252a opposite thereto. The first end portion 251a is an open end portion positioned on the electrode portion 23a side, and the second end portion 252a has a land shape connected to the wiring substrate 40.

The second Y-direction electrode portion 23b is connected to a second lower wiring portion 24b that is approximately linearly formed along one short side of the support 21. The second lower wiring portion 24b is used for electrically connecting the electrode portion 23b to the wiring substrate 40. The electrode portion 23b and the upper wiring portion 24b constitute a second lower conductor pattern 25b (second conductor pattern).

The second lower conductor pattern 25b includes a first end portion 251b positioned on the electrode portion 23b side and a second end portion 252b opposite thereto. The first end portion 251b is an open end portion, and the second end portion 252b is connected to the wiring substrate 40.

The lower conductor patterns 25a and 25b are also formed by a print body of a conductive material. The conductive material may be formed of a conductive paste, a conductive thin film, a conductive piece, or the like. In this embodiment, the lower conductor patterns 25a and 25b are formed of print patterns of a silver paste by a screen printing method. A thickness of the lower conductor patterns 25a and 25b is not particularly limited, and may be set to about 10 μm, for example.

The touch panel 1 includes on the resistive layer 22 a first lower-electrode-side structure layer 26a (second structure layer) adjacent to the first end portion 251a of the first lower conductor pattern 25a. The first lower-electrode-side structure layer 26a has a thickness that is gradually reduced in proportion to a distance from the first end portion 251a of the first lower conductor pattern 25a.

The touch panel 1 also includes on the resistive layer 22a second lower-electrode-side structure layer 26b (second structure layer) adjacent to the first end portion 251b of the second lower conductor pattern 25b. The second lower-electrode-side structure layer 26b has a thickness that is gradually reduced in proportion to a distance from the first end portion 251b of the second lower conductor pattern 25b.

The lower-electrode-side structure layers 26a and 26b are formed of the same material (silver paste in this embodiment) as the lower conductor patterns 25a and 25b. Therefore, the lower-electrode-side structure layer 26a and 26b may be formed at the same time when the lower conductor patterns 25a and 25b are formed.

The first lower-electrode-side structure layer 26a is formed along the longitudinal direction (X direction) of the first Y-direction electrode portion 23a. The first lower-electrode-side structure layer 26a is constituted of the plurality of structures that are intermittently formed from the first end portions 251a and 251b of the first lower conductor patterns 25a and 25b, respectively. On the other hand, the second lower-electrode-side structure layer 26b is the same as the first lower-electrode-side structure layer 26a described above in that the first and second lower-electrode-side structure layers 26a and 26b are formed along the longitudinal direction (Y direction) of the second X-direction electrode portion 23a, and they are each constituted of the plurality of structures that are intermittently formed from the first end portion 251b of the second lower conductor pattern 25b. However, the second lower-electrode-side structure layer 26b is different from the first lower-electrode-side structure layer 26a in that the structures of the second lower-electrode-side structure layer 26b are diagonally formed toward the first lower conductor pattern 25a side. It should be noted that the other structures of the structure layers 26a and 26b are the same as those of the second upper-electrode side structure layer 16b described above with reference to FIGS. 3 and 4, and therefore a detailed description thereof is omitted.

[Double-Sided Tape]

The double-sided tape 30 bonds the upper substrate 10 with the lower substrate 20 so that the resistive layer 12 and the resistive layer 22 are opposed to each other. The double-sided tape 30 is formed of an electric insulating material.

The double-sided tape 30 is formed into a frame shape including an outer peripheral portion 30a and an inner peripheral portion 30b for opening display areas (shaded area of FIG. 2) of the resistive layers 12 and 22. On an outer peripheral side of one short side of the double-sided tape 30, a cutout 30c for opening a connection part of the wiring substrate 40 described later. The thickness of the double-sided tape 30 is not particularly limited, and may be about 50 μm.

An upper surface side of the double-sided tape 30 forms a bonding surface (first bonding surface) that covers the upper conductor patterns 15a and 15b and the upper-electrode-side structure layers 16a and 16b that are formed on the upper substrate 10. A lower surface side of the double-sided tape 30 forms a bonding surface (second bonding surface) that covers the lower conductor patterns 25a and 25b and the lower-electrode-side structure layers 26a and 26b that are formed on the lower substrate 20.

With this structure, when the upper substrate 10 and the lower substrate 20 are bonded to each other with the double-sided tape 30, the electrical insulation is secured between the upper conductor patterns 15a and 15b and the lower conductor patterns 25a and 25b. In the same way, electrical insulations are secured between the electrical insulation between the upper conductor patterns 15a and 15b and the lower-electrode-side structure layers 26a and 26b, between the upper-electrode-side structure layers 16a and 16b and the lower conductor patterns 25a and 25b, and between upper-electrode-side structure layers 16a and 16b and the lower-electrode-side structure layers 26a and 26b, respectively.

It should be noted that an insulation film such as a resist film may be additionally formed on each of the conductor patterns in order to more positively secure the electrical insulation between the conductor patterns.

When the upper substrate 10 and the lower substrate 20 are bonded, minute spacers each having a predetermined size are dispersed on the surfaces of the resistive layers 12 and 22 between the upper and lower substrates 10 and 20, although not shown. As a result, the resistive layers 12 and 22 are prevented from being in contact in a state where the touch panel is not used.

The double-sided tape 30 is a specific example of a "bonding layer" according to the embodiment. In place of the double-sided tape, an adhesive resin sheet or the like may be used. The double-sided tape 30 doubles as a gap formation member for forming a certain gap between the upper substrate 10 and the lower substrate 20 and an insulating material for ensuring the electrical insulation between the upper substrate 10 and the lower substrate 20.

FIGS. 5A and 5B are plan views showing the upper conductor patterns 15a and 15b and the lower conductor patterns 25a and 25b, when viewed from the display surface (upper surface of the upper substrate 10) side of the touch panel 1, respectively. Similarly, FIG. 5C is a plan view showing the conductor pattern 15a and 15b, and 25a and 25b in a state where the upper substrate 10 and the lower substrate 20 are bonded. In the state where the upper substrate 10 and the lower substrate 20 are bonded by the double-sided tape 30, the first upper-electrode-side structure layer 16a and the second lower-electrode-side structure layer 26b are opposed with respect to the double-sided tape 30 in the thickness direction (Z direction) of the touch panel 1 as shown in FIG. 5C.

Figure 6A:
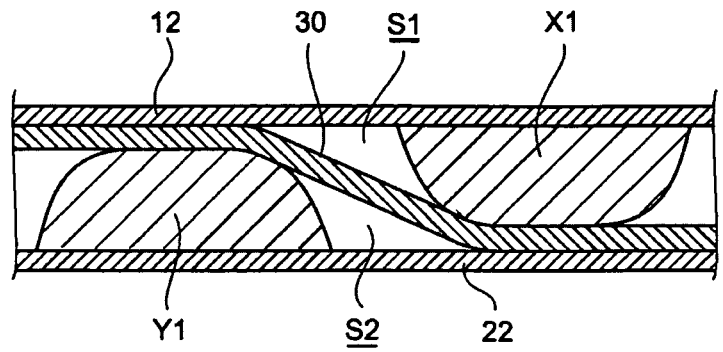
FIGS. 6A to 6C are cross-sectional schematic diagrams of a main part, for explaining an operation of the first structure layer and a second structure layer that constitute the touch panel of FIG. 1.
Figure 6B:
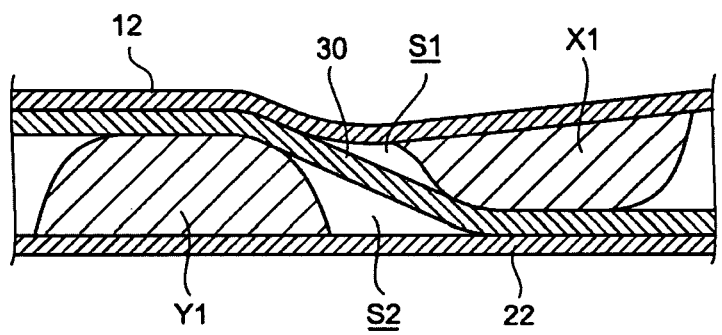
Figure 6C:
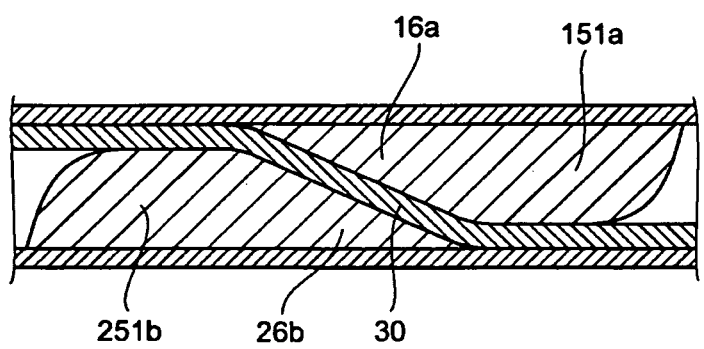

Here, FIGS. 6A to 6C are schematic diagrams each showing a cross-sectional structure in the vicinity of opposed end portions of the first X-direction electrode portion 13a and the second Y-direction electrode portion 23b. FIGS. 6A and 6B each shows a cross-sectional structure in a case where the upper-electrode-side structure layer 16a and the lower-electrode-side structure layer 26b are not formed. In the figures, the end portions of the electrode portions are represented by X1 and Y1, respectively. It should be noted that the thickness of each end portion of the electrode portions is hyperbolized in FIG. 6, and therefore may be different in actuality in relation to the thickness of the double-sided tape 30 in some cases.

The electrode portions are each formed to have a predetermined thickness between the resistive layers 12 and 22. Therefore, the double-sided tape 30 may sometimes be unable to absorb a difference in level caused between the end portions X1 and Y1 of the electrode portions and the resistive layers 12 and 22. In this case, as shown in FIG. 6A, a gap S1 is generated between the double-sided tape 30 and the resistive layer 12 in the vicinity of the end portion X1 of the electrode portion, and a gap S2 is generated between the double-sided tape 30 and the resistive layer 22 in the vicinity of the end portion Y1 of the electrode portion. The gaps S1 and S2 allow air to freely pass between the inside and the outside of the touch panel 1, which causes inconvenience in that the upper substrate easily sags under a slight pressure difference between the inside and the outside of the touch panel 1.

In particular, in a case where a pressure inside the touch panel 1 decreases, the upper substrate sags toward the lower substrate, as shown in FIG. 6B. As a result, an interference fringe of light, which is known as a Newton ring, is generated on the surface of the upper substrate, which may deteriorate visibility of an image viewed through the touch panel 1. Further, when the vicinity of the inner peripheral portion of the double-sided tape 30 is pressed and operated, the pressed portion may be dented and hardly return to its original position.

In contrast, in this embodiment, the upper-electrode-side structure layer 16a and the lower-electrode-side structure layer 26b are provided so as to be adjacent to the end portion 151a of the X-direction electrode portion 13a and the end portion 251b of the Y-direction electrode portion 23b, respectively. As shown in FIG. 6C, the respective structure layers 16a and 26b are formed so that the thicknesses thereof are gradually reduced in proportion to the distances from the end portions 151a and 251b of the electrode portions. Accordingly, the differences in level between the surfaces of the resistive layers and the surfaces of the end portions of the electrode portions, which may be caused on the respective end portions 151a and 251b sides of the electrode portions, are reduced by the structure layers 16a and 26b. As a result, the gaps between the end portions 151a and 251b of the electrode portions 13a and 13b and the resistive layers 12 and 22 can be effectively reduced, respectively.

Accordingly, in this embodiment, air can be prevented from freely passing through the gaps, and a change in inner pressure of touch panel 1 along with pressure variation of the outside can be reduced. Thus, the occurrence of the Newton ring on the surface of the touch panel 1 due to the pressure difference between the inside and the outside of the touch panel 1 can be suppressed.

It should be noted that in the example shown in FIG. 6C, the structure layers 16a and 26b are continuously formed from the end portions 151a and 251b of the electrode portions to completely occlude the gaps, but this form may not be necessarily obtained at any time. The gaps may not of course be occluded completely depending on the shape of each structure layers 16a and 26b. Even in this case, however, it is obvious that the gaps S1 and S2 can be reduced at a larger extent as compared to the case where the structure layers 16a and 26b are not provided as shown in FIG. 6A.

Figure 7A:
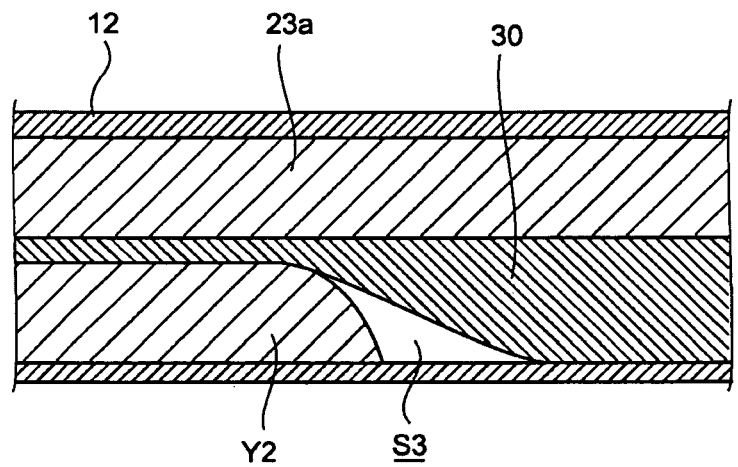
FIGS. 7A and 7B are cross-sectional schematic diagrams of another main part, for explaining an operation of the first and second structure layers that constitute the touch panel of FIG. 1.

Also, regarding the first end portion 151b of the second X-direction electrode portion 13b and the first end portion 251a of the Y-direction electrode portion 25a, the same operation as that of the structure layers 16a and 26b can be obtained by using the second upper-electrode-side structure layer 16b and the lower-electrode-side structure layer 26a. FIG. 7A is a diagram showing a cross-sectional structure on the first lower-electrode-side structure layer 26a side, in which the end portion of the electrode is represented by Y2. It should be noted that in FIGS. 7A and 7B, a relationship between the thickness of the end portion of the electrode portion and the thickness of the double-sided tape 30 may be different in actuality in some cases.

As described above, the electrode portion has a predetermined thickness between the resistive layers, so the double-sided tape 30 may not sometimes absorb a difference in level between an end portion Y2 of the electrode portion and the resistive layer 22. In this case, as shown in FIG. 7A, a gap S3 is caused between the double-sided tape 30 and the resistive layer 22 in the vicinity of the end portion Y2 of the electrode portion. The gap S3 allows air to freely pass between the inside and the outside of the touch panel 1, which causes inconvenience that the upper substrate easily sags due to a slight pressure difference between the inside and the outside of the touch panel 1.

Figure 7B:
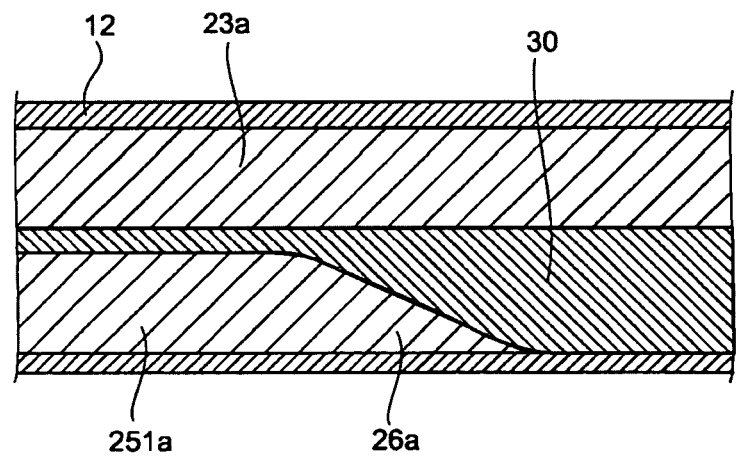

In contrast, in this embodiment, the lower-electrode-side structure layer 26a is provided so as to be adjacent to the end portion 251a of the Y-direction electrode portion 23a. As shown in FIG. 7B, the structure layer 26a is formed so that the thicknesses thereof are gradually reduced in proportion to the distance from the end portion 251a of the electrode portion. Accordingly, the difference in level between the surface of the end portion of the electrode portion and the surface of the resistive layer, which may be caused on the end portion 251a side of the electrode portion, is reduced by the structure layer 26a. As a result, the difference in level between the end portion 251a of the electrode portion 23a and the resistive layer 22 can be effectively reduced, respectively.

Also, although not shown, a difference in level between the double-sided tape 30 and the resistive layer 12, which is generated on the first end portion 151b side of the second X-direction electrode portion 13b, can be absorbed by the second upper-electrode-side structure layer 16b in the same way. As a result, the gap between the end portion 15b of the electrode portion 13b and the resistive layer 12 can be effectively reduced.

Accordingly, in this embodiment, air can be prevented from freely passing through the gaps, and a change in inner pressure of touch panel 1 along with pressure variation of the outside can be reduced. Thus, the occurrence of the Newton ring on the surface of the touch panel 1 due to the pressure difference between the inside and the outside of the touch panel 1 can be suppressed.

Although in the example shown in FIG. 7B, the structure layer 26a is continuously formed from the end portion 251a of the electrode portion to completely occlude the gap, this form may not be necessarily obtained at any time. The gap may not be occluded completely depending on the shape of the structure layer 26a. Even in this case, however, it is obvious that the gap S3 can be reduced to a larger extent as compared to the case where the structure layer 26a is not provided as shown in FIG. 7A.

[Wiring Substrate]

The touch panel 1 according to this embodiment includes the wiring substrate 40 disposed between the upper substrate 10 and the lower substrate 20 on one short side thereof. The wiring substrate 40 electrically connects the respective electrode portions of the touch panel 1 to an external power supply circuit (not shown).

The wiring substrate 40 is structured by a flexible wiring substrate having terminals for wiring connection that is formed on an upper surface and lower surface thereof. On the upper surface of the wiring substrate 40, a terminal portion connected to the second end portion 152a of the first upper conductor pattern 15a and a terminal portion connected to the second end portion 152b of the second upper conductor pattern 15b are formed. On the lower surface of the wiring substrate 40, a terminal portion connected to the second end portion 252a of the first lower conductor pattern 25a and a terminal portion connected to the second end portion 252b of the second lower conductor pattern 25b are formed.

For the connections between the end portions 152a and 152b of the substrate 10 and the end portions 252a and 252b of the lower substrate 20, an ACF (anisotropically conductive film) may be used. By using this, the wiring substrate 40 can be electrically and mechanically connected to the upper substrate 10 and the lower substrate 20. In this embodiment, in order to stably connecting the wiring substrate 40 to the upper substrate 10 and the lower substrate 20, and prevent the upper substrate 10 from sagging in connection areas of the wiring substrate 40, dummy terminals 17 and 27 each of which does not have an electrical circuit are formed at predetermined positions of the upper substrate 10 and the lower substrate 20.

Figure 8:
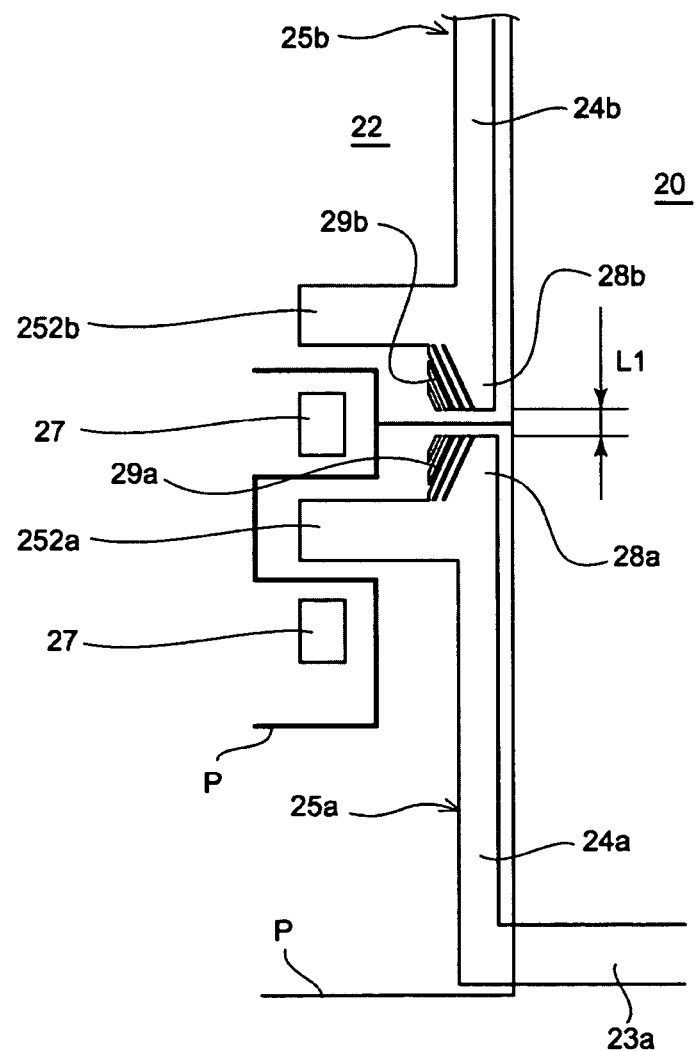
FIG. 8 is a plan view of a main part showing a connection area with a wiring substrate in the lower substrate that constitutes the touch panel of FIG. 1.

FIG. 8 is an enlarged plan view showing a connection part with the wiring substrate 40 in the lower substrate 20. The end portion 252a of the lower conductor pattern 25a is formed so as to be approximately perpendicular to the lower wiring portion 24a. In the same way, the end portion 252b of the lower conductor pattern 25b is formed so as to be approximately perpendicular to the lower wiring portion 24b. In this embodiment, first and second lower-terminal-side structure layers 29a and 29b (fourth structure layers) whose thicknesses are gradually changed are formed adjacently to the end portions 252a and 252b of the lower conductor patterns 25a and 25b, respectively.

The first lower-terminal-side structure layer 29a is formed so that the thickness thereof is gradually reduced in proportion to the distance from the end portion 252a of the lower conductor pattern 25a. The second lower-terminal-side structure layer 29b is formed so that the thickness thereof is gradually reduced in proportion to the distance from the end portion 252b of the lower conductor pattern 25b.

In this embodiment, at portions where the lower wiring portions 24a and 24b are opposed, first and second extending portions 28a and 28b that are extended in an approaching direction therefrom are formed. The first lower-terminal-side structure layer 29a is constituted of a plurality of structures formed toward the end portion 252b of the lower conductor pattern 25b from the first extending portion 28a. Also, the second lower-terminal-side structure layer 29b is constituted of a plurality of structures formed toward the end portion 252a of the lower conductor pattern 25a from the second extending portion 28b.

The lower-terminal-side structure layers 29a and 29b can be formed similarly to the upper-electrode-side structure layers 16a and 16b described above with reference to FIGS. 3 and 4. In addition, the lower-terminal-side structure layers 29a and 29b are made of the same material (silver paste in this embodiment) as the lower conductor patterns 25a and 25b by the screen printing method similarly to the lower conductor patterns 25a and 25b.

It should be noted that a linear line P of FIG. 8 that is disposed between the patterns shows an etching pattern formed in the resistive layer 22. The line P physically sections the resistive layers 22 into a plurality of areas, thereby securing electrical insulation between the areas.

Figure 9:
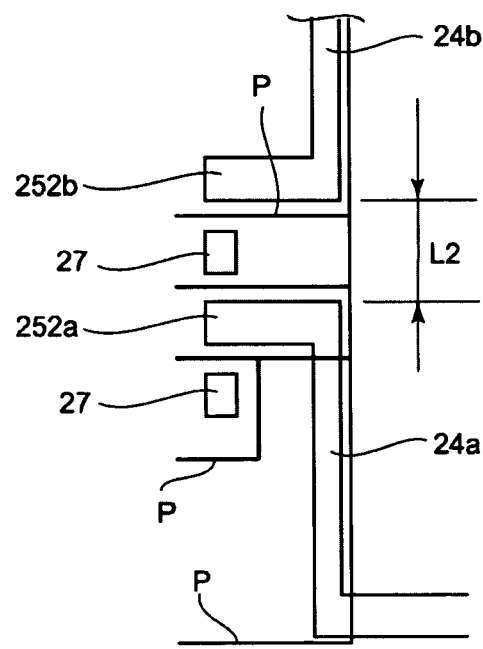
FIG. 9 is a plan view of a main part showing a connection area with the wiring substrate as a comparative example of FIG. 8.

FIG. 9 is a plan view showing a connection portion of the wiring substrate on the lower substrate as a comparative example. In FIG. 9, for convenience of explanation, portions corresponding to those of FIG. 8 are denoted by the same symbols. In the comparative example shown in FIG. 9, counterparts of the extending portions 28a and 28b and the structure layers 29a and 29b shown in FIG. 8 are not provided. In addition, a closest approach distance L2 between the end portions 252a and 252b is longer than a closest approach distance L1 between the end portions 252a and 252b in the example of FIG. 8.

Accordingly, in this embodiment shown in FIG. 8, it is possible to significantly reduce a gap area between the resistive layer 22 and the wiring substrate 40 due to the thicknesses of the end portions 252a and 252b, which is generated when the wiring substrate 40 is connected to the end portions 252a and 252b or the like, as compared to the example shown in FIG. 9. Further, because the thicknesses of the structure layers 29a and 29b are gradually reduced in proportion to the distance from the end portions 252a and 252b, the gap generated between the resistive layer 22 and the wiring substrate 40 can be effectively occluded.

As described above, in this embodiment, air can be prevented from freely passing through the gap, and a change in inner pressure of the touch panel 1 along with pressure variation of the outside can be reduced. As a result, the occurrence of the Newton ring on the surface of the touch panel 1 due to the pressure difference between the inside and the outside of the touch panel 1 can be suppressed.

[Other Structures]

Figure 10:
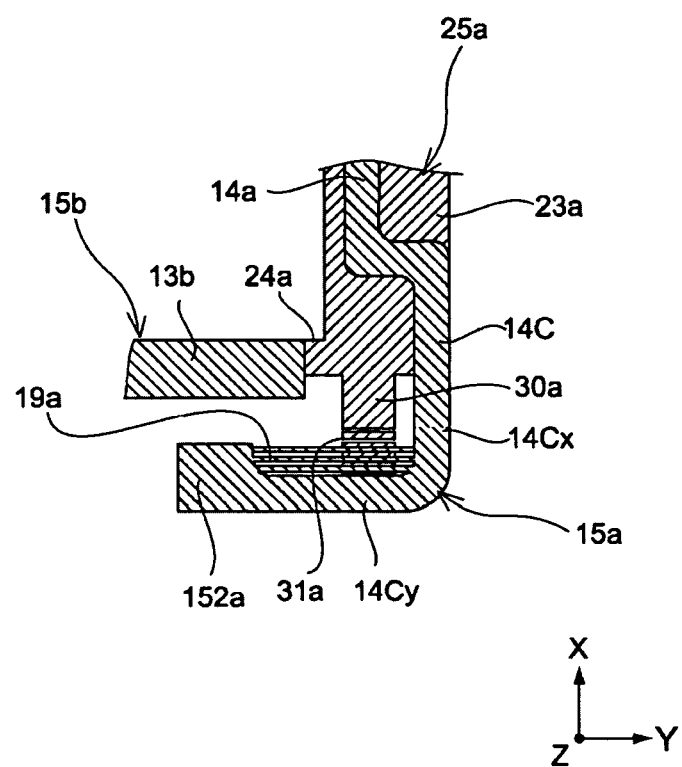
FIG. 10 is a plan view of a main part showing a relationship among various conductor patterns that constitute the touch panel of FIG. 1.

FIG. 10 is an enlarged view of a lower right corner portion of a group of the conductor patterns shown in FIG. 5C. FIG. 10 shows a part at which the second X-direction electrode portion 13b formed on the upper substrate 10 and the first Y-direction electrode portion 23a formed on the lower substrate 20 are opposed.

In this embodiment, regarding the upper substrate 10, an upper-terminal-side structure layer 19a (third structure layer) whose thickness is gradually changed is formed on the resistive layer 12 adjacently to the second end portion 152a of the first upper conductor pattern 15a.

In particular, in this embodiment, the upper wiring portion 14a constituting the upper conductor pattern 15a partly includes a crank portion 14C that establishes connection to the end portion 152a by being bended toward the outer peripheral side. The crank portion 14C includes a first line segment 14Cx that is parallel to the X-axis direction and a second line segment 14Cy that is parallel to the Y-axis direction and connected to the end portion 152a. The upper-terminal-side structure layer 19a is constituted of a plurality of structures whose thicknesses are gradually reduced toward the X-axis direction from the inner peripheral side of the second line segment 14Cy.

The upper-terminal-side structure layer 19a can be formed in the same way as the upper-electrode-side structure layers 16a and 16b described above with reference to FIGS. 3 and 4. Further, the upper-terminal-side structure layer 19a can be formed of the same material (silver paste in this embodiment) as the upper conductor pattern 15a by the screen printing method similarly to the upper conductor pattern 15a.

Further, in this embodiment, regarding the lower substrate 20, on the resistive layer 22, a projecting portion 30a that projects toward X direction is formed at the end portion of the lower wiring portion 24a side of the Y-direction electrode portion 23a that structures the lower conductor pattern 25a. In addition, a lower additional structure layer 31a (fifth structure layer) is formed adjacently to the projecting portion 30a. The lower additional structure layer 31a has a thickness that is gradually reduced in proportion to a distance from the projecting portion 30a. The lower additional structure layer 31a is constituted of a plurality of structures formed from the projecting portion 30a in the X-axis direction.

The lower additional structure layer 31a may be formed similarly to the upper-electrode-side structure layers 16a and 16b described above with reference to FIGS. 3 and 4. In addition, the lower additional structure layer 31a is made of the same material (silver paste in this embodiment) as the lower conductor pattern 25a by the screen printing method similarly to the lower conductor pattern 25a.

As shown in FIG. 10, the upper-terminal-side structure layer 19a and the lower additional structure layer 31a are opposed with respect to the double-sided tape 30 (not shown) in the Z-axis direction (thickness direction of the touch panel 1). Therefore, when the upper substrate 10 and the lower substrate 20 are bonded with the double-sided tape 30, the same effect as described with reference to FIG. 6C may be obtained. That is, as compared to the case where the structure layers 19a and 31a are not provided, it is possible to significantly reduce the gaps between the resistive layers 12 and 22 and the double-sided tape 30 at the part where the end portion of the electrode portion 23a and the end portion of the electrode portion 13b are opposed as shown in FIG. 10. With this structure, the difference in level between the surface of the electrode portion and the surface of the resistive layer due to the thicknesses of the electrode portions 23a and 13b is effectively absorbed by the double-sided tape 30, and thus air can be prevented from freely passing through the part.

Thus, in this embodiment, it is possible to reduce the change in inner pressure of the touch panel 1 along with the pressure variation of the outside. Accordingly, the occurrence of the Newton ring on the surface of the touch panel 1 due to the pressure difference between the inside and the outside of the touch panel 1 can be suppressed.

Further, in the structural example shown in FIG. 10, the crank portion 14C is partly formed on the upper wiring portion 14a, and the projecting portion 30a that projects from the end portion of the electrode portion 23a is formed between the crank portion 14C and the end portion of the electrode portion 13b. With this structure, the upper substrate 10 and the lower substrate 20 can be bonded such that the upper surface side and the lower surface side of the double-sided tape 30 are surrounded by the electrode portion 13b, the crank portion 14C, and the projecting portion 30a.

Figure 11A:
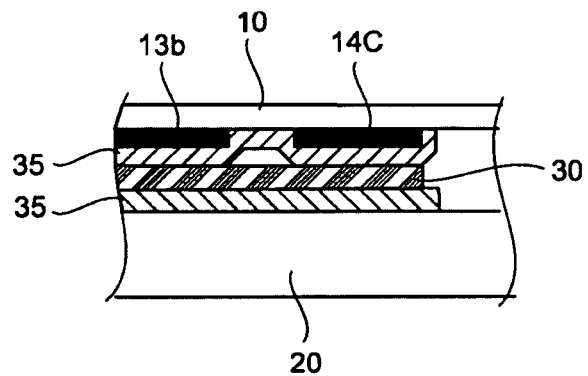
FIGS. 11A and 11B are plan views of a main part, for explaining operations of the various conductor patterns that constitute the touch panel of FIG. 1.
Figure 11B:
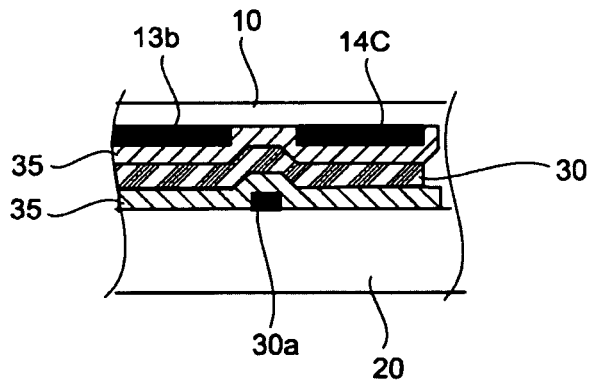

For example, FIG. 11A is a schematic cross-sectional diagram showing a state of being in parallel to the Y axis when the projecting portion 30a is not formed. FIG. 11B is a similar schematic cross-sectional diagram when the projection portion 30a is formed as shown in FIG. 10. As shown in FIG. 11B, the projecting portion 30a projects toward the lower surface of the double-sided tape 30, and the electrode portion 13b and the crank portion 14C project above the upper surface of the double-sided tape 30 so as to sandwich the both sides thereof. With this structure, adhesiveness on the upper substrate 10 side and the lower substrate 20 side with respect to the double-sided tape 30 is increased, which can increase bonding reliability of the substrates 10 and 20.

It should be noted that in FIGS. 11A and 11B, reference numeral 35 denotes a resist film having an electrical insulation property which is formed on the respective conductor patterns of the upper substrate 10 and the lower substrate 20. Of course, the touch panel 1 may be formed without the resist film 35. Further, the resistive layers 12 and 22 are not shown in FIGS. 11A and 11B.

Next, a manufacturing method of the touch panel 1 structured as described above according to this embodiment will be described.

[Manufacturing Process of Upper Substrate]

The resistive layer 12 is formed on the support 11. The resistive layer 12 may be an ITO film formed by the sputtering method, for example. The resistive layer 12 formed is etched by using a laser beam for each predetermined region to be electrically separated.

Next, on the resistive layer 12, the upper conductor patterns 15a and 15b (first conductor pattern), the upper-electrode-side structure layers 16a and 16b (first structure layer), the upper-terminal-side structure layer 19a (third structure layer), and the dummy terminal 17 are formed by the screen printing method. As a printing material, a metal paste such as a silver paste can be used.

By the screen printing method, with the use of a silk screen or stencil mask on which a printing pattern is formed, the structure layers 16a, 16b, and 19a can be formed so as to be adjacent to the end portions 151a, 151b, and 152a of the conductor patterns 15a and 15b with desired form accuracy. In addition, by appropriately adjusting the viscosity or density of the printing material, the structure layers 16a, 16b, and 19a can be formed with a desired gradient. Accordingly, the structure layers 16a, 16b, and 19a each having a three-dimensional structure in which the thickness thereof is gradually reduced in proportion to the distance from the end portions of the conductor patterns 15a and 15b are formed.

The respective printed layers are collectively formed in the same printing process, but may of course be separately formed in different printing processes.

Subsequently, a process of drying the printed layer on the resistive layer 12 is carried out. After that, a process of forming an electrically insulating resist film is carried out on each printed layer as appropriate. The resist film can be formed by the screen printing method, for example.

As described above, the upper substrate 10 is manufactured.

[Manufacturing Process of Lower Substrate]

The resistive layer 22 is formed on the support 21. The resistive layer 22 may be an ITO film formed by the sputtering method, for example. The resistive layer 22 formed is etched by using a laser beam for each predetermined region, to be electrically separated.

Next, on the resistive layer 22, the lower conductor patterns 25a and 25b (second conductor pattern), the lower-electrode-side structure layers 26a and 26b (second structure layer), the lower-terminal-side structure layer 29a and 29b (fourth structure layer), the lower additional structure layer 31a (fifth structure layer), and the dummy terminal 27 are formed by the screen printing method. As a printing material, a metal paste such as a silver paste may be used.

By the screen printing method, with the use of a silk screen or stencil mask on which a printing pattern is formed, the structure layers 26a and 26b, 29a and 29b, and 31a can be formed so as to be adjacent to the first end portions 251a and 251b, the second end portion 252a and 252b, and the projecting portion 30a of the conductor patterns 15a and 15b, respectively, with desired form accuracy. In addition, by appropriately adjusting the viscosity or density of the printing material, the structure layers 26a and 26b, 29a and 29b, and 31a can be formed with a desired gradient. Accordingly, the structure layers 26a and 26b, 29a and 29b, and 31a each having a three-dimensional structure in which the thickness thereof is gradually reduced in proportion to the distance from the end portions of the conductor patterns 15a and 15b are formed.

The respective printed layers are collectively formed in the same printing process, but may of course be separately formed in different printing processes.

As described above, the lower substrate 20 is manufactured.

Subsequently, a process of drying the printed layer on the resistive layer 22 is carried out. After that, a process of forming an electrically insulating resist film is carried out on each printed layer as appropriate. The resist film can be formed by the screen printing method, for example.

[Bonding Process]

Next, the substrates 10 and 20 are bonded with the double-sided tape 30 so that the resistive layer 12 of the upper substrate 10 and the resistive layer 22 of the lower substrate 20 are opposed. In a display area (area inside the inner periphery of the double-sided tape 30) between the upper substrate 10 and the lower substrate 20, spacers (not shown) each having a predetermined size are dispersed.

The first bonding surface of the double-sided tape 30 is bonded to the upper substrate 10 so as to cover the upper conductor patterns 15a and 15b excluding the end portions 152a and 152b, the upper-electrode-side structure layers 16a and 16b, and the upper-terminal-side structure layer 19a. Further, a second bonding surface of the double-sided tape 30 is bonded to the lower substrate 20 so as to cover the lower conductor patterns 25a and 25b excluding the end portions 252a and 252b, the lower-terminal-side structure layers 29a and 29b, and the lower additional structure layer 31a.

As a method of bonding the double-sided tape 30, the first bonding surface of the double-sided tape 30 is bonded to the upper substrate 10, and then the second bonding surface of the double-sided tape 30 is bonded to the lower substrate 20, for example. Of course, the double-sided tape 30 may be bonded to the lower substrate 20 and then bonded to the upper substrate 10.

As described above, the upper substrate 10 and the lower substrate 20 are bonded.

[Connection Process of Wiring Substrate]

Subsequently, the wiring substrate 40 is connected to the upper substrate 10 and the lower substrate 20. The end portions 152a and 152b of the upper conductor patterns 15a and 15b and the end portions 252a and 252b of the lower conductor patterns 25a and 25b are exposed to outside through the cutout 30c of the double-sided tape 30, together with the dummy terminals 17 and 27.

In the wiring substrate 40, the end portions 152a and 152b and the dummy terminal 17 are respectively connected to a terminal group on an upper surface side thereof. In addition, the end portions 252a and 252b and the dummy terminal 27 are respectively connected to a terminal group on a lower surface side thereof. For connecting the terminal groups of wiring substrate 40 with the end portions or terminals, the ACF is used. Thus, the wiring substrate 40 and the substrates 10 and 20 are electrically and mechanically connected with each other.

As described above, the touch panel 1 according to this embodiment is manufactured.

[Operation of Touch Panel]

The touch panel 1 according to this embodiment is provided on an LCD monitor, an EL monitor, and a CRT monitor. Images including various icons displayed on a monitor are visually confirmed through the touch panel 1 by a user. In the touch panel 1, a pulse voltage is applied alternately to the X-direction electrode portions 13a and 13b and the Y-direction electrode portions 23a and 23b from an external power supply circuit through the wiring substrate 40. An output of the touch panel 1 is input to a controller of the monitor.

For the touch panel 1, a resistive-type touch panel is employed. In a state where the touch panel 1 is not operated, a predetermined gap is formed between the resistive layer 12 of the upper substrate 10 and the resistive layer 22 of the lower substrate 20 by the spacer. Therefore, the voltage between the X-direction electrode portions 13a and 13b and the voltage between the Y-direction electrode portions 23a and 23b do not change.

When the touch panel 1 is operated, a predetermined area on the upper substrate 10 is pressed by the user. A part of the resistive layer 12 on the upper substrate 10 that corresponds to the pressed area is brought into contact with the resistive layer 22 on the lower substrate 20. As a result, the voltages between the X-direction electrode portions 13a and 13b and between the Y-direction electrode portions 23a and 23b respectively change. Thus, the pressed position of the touch panel 1 by the user is electrically detected.

The controller of the monitor detects an icon on which the user has performed the input out of the icons on the screen based on the output from the touch panel 1. Then, the controller starts to perform control preset based on the selected icon. In this way, the touch panel 1 functions as an input interface of various controller apparatuses.

Effect of this Embodiment

The touch panel 1 according to this embodiment includes the upper-electrode-side structure layers 16a and 16b which are adjacent to the first end portions 151a and 151b of the upper conductor patterns 15a and 15b, and each of which has the three-dimensional structure in which the thickness is gradually reduced in proportion to the distance from each end portion thereof. With this structure, the gap between the double-sided tape 30 and the resistive layer 12 in the vicinity of each end portions 151a and 151b is significantly reduced, which prevents air from freely passing the gap.

In addition, the touch panel 1 according to this embodiment includes the lower-electrode-side structure layers 26a and 26b which are adjacent to the first end portions 251a and 251b of the lower conductor patterns 25a and 25b, and each of which has the three-dimensional structure in which the thickness is gradually reduced in proportion to a distance from each end portion thereof. With this structure, the gap between the double-sided tape 30 and the resistive layer 22 in the vicinity of each end portions 251a and 251b is significantly reduced, which prevents air from freely passing the gap.

In addition, the touch panel 1 according to this embodiment includes the upper-terminal-side structure layer 19a which is adjacent to the second end portion 152a of the upper conductor pattern 15a, and has the three-dimensional structure in which the thickness is gradually reduced. With this structure, the gap between the double-sided tape 30 and the resistive layer 12 in the vicinity of the end portions 152a is significantly reduced, which prevents air from freely passing the gap.

In addition, the touch panel 1 according to this embodiment includes the lower-terminal-side structure layers 29a and 29b that are adjacent to the second end portions 252a and 252b of the lower conductor patterns 25a and 25b, and each of which has the three-dimensional structure in which the thickness is gradually changed. With this structure, the gap between the double-sided tape 30 and the resistive layer 22 in the vicinity of the end portions 252a and 252b is significantly reduced, which prevents air from freely passing the gap.

As described above, according to this embodiment, the sag in the surface of the touch panel 1 due to the pressure difference between the inside and the outside of the touch panel 1 can be prevented, and the occurrence of the Newton ring on the display surface can be suppressed.

The existence/nonexistence of the Newton ring under a predetermined condition by using the touch panel including the upper-electrode-side structure layers 16a and 16b, the lower-electrode-side structure layer 26a and 26b, the upper-terminal-side structure layer 19a, and the lower-terminal-side structure layers 29a and 29b described above, and a touch panel which does not include those structure layers were compared. Procedures of this experiment are as follows. Samples of the touch panels produced at an atmospheric pressure were maintained in a reduced-pressure atmosphere for a certain time period. After that, the atmosphere was returned to the atmospheric pressure and whether the Newton ring occurs on the panel surface was checked. As a result of the experiment, in two samples out of ten having no structure layer described above, the Newton ring was confirmed. In contrast, in twenty samples having the structure layers described above, no Newton ring was confirmed.

FIGS. 12A to 12C are schematic diagrams each showing a representative generation form of the Newton ring. FIG. 12A shows an example in which a Newton ring NR elliptically occurs approximately in the center of a surface of an upper substrate SUB. This example is often caused when the substrate SUB entirely sags inwards due to reduction of air in the inside of the touch panel. FIG. 12B shows an example in which a long, thin Newton ring NR occurs in a portion near one long side of the upper substrate SUB. FIG. 12C shows an example in which the Newton rings NR locally occur on corner portions of the upper substrate SUB and a connection area with a wiring substrate PWB. The examples of FIGS. 12B and 12C may be caused by local deformation of the upper substrate SUB due to loss of air from the inside of the touch panel and strain of the upper substrate SUB.

In this embodiment, by providing the structure layers described above, the occurrence of the Newton rings as illustrated in, e.g., FIGS. 12A to 12C can be effectively suppressed.

But, the present application is not limited to the above embodiment, and can of course be modified variously without departing from the spirit and scope of the present application.

For example, in the above embodiment, described is the touch panel 1 including the upper-electrode-side structure layers 16a and 16b, the lower-electrode-side structure layers 26a and 26b, the upper-terminal-side structure layer 19a, and the lower-terminal-side structure layers 29a and 29b, as an example. However, it is unnecessary to provide all the structure layers described above. By providing only any one of those structure layers, a certain effect may be obtained.

Further, in the above embodiment, the first end portions of the first and second conductor patterns are explained as the end portions on the electrode portion side. However, the end portion on the connection side with the wiring substrate may be structured as the first end portion. In this case, by forming the structure layer adjacently to the end portion of the conductor pattern on the connection side with the wiring substrate, air is prevented from freely passing at the connection part of the wiring substrate, with the result that the sag of the upper substrate can be prevented, and thus the occurrence of the Newton ring can be prevented.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A touch panel, comprising:
   a first support that is transparent;
   a second support that is transparent;
   a first resistive layer formed on the first support;
   a second resistive layer formed on the second support;
   a first conductor pattern including a first electrode portion that extends in a first direction, and a first conductor pattern first end portion and a first conductor pattern second end portion opposite thereto, the first conductor pattern being formed on the first resistive layer;
   a second conductor pattern including a second electrode portion that extends in a second direction that intersects with the first direction, and a second conductor pattern first end portion and a second conductor pattern second end portion opposite thereto, the second conductor pattern being formed on the second resistive layer;

a first structure layer that is formed on the first resistive layer adjacent to the first conductor pattern first end portion, the first structure layer extending above a planar surface of the first support and having a height above the first support that is gradually reduced in proportion to a distance from the first conductor pattern first end portion; and a bonding layer including a first bonding surface that covers the first conductor pattern and the first structure layer and a second bonding surface that covers the second conductor pattern.

2. The touch panel according to claim 1,
wherein the first conductor pattern first end portion is located on a side of the first electrode portion.

3. The touch panel according to claim 2,
wherein the first structure layer is made of the same material as the first conductor pattern.

4. The touch panel according to claim 3,
wherein the first structure layer is formed of a gradation printed layer, a formation area of which is gradually reduced in proportion to a distance from the first end portion of the first conductor pattern.

5. The touch panel according to claim 4,
wherein the first structure layer includes a plurality of structures that are intermittently formed from the first conductor pattern first end portion.

6. The touch panel according to claim 4,
wherein the first structure layer is continuously formed from the first conductor pattern first end portion.

7. The touch panel according to claim 2, further comprising:
a second structure layer that is formed on the second resistive layer adjacent to the second conductor pattern first end portion, the second structure layer extending above a planar surface of the second support and having a height above the second support that is gradually reduced in proportion to a distance from the second conductor pattern first end portion.

8. The touch panel according to claim 7,
wherein the second conductor pattern first end portion is located on a side of the second electrode portion.

9. The touch panel according to claim 8,
wherein the first structure layer and the second structure layer are opposed with respect to the bonding layer.

10. The touch panel according to claim 2, further comprising:
a third structure layer that is formed on the first resistive layer adjacently to the second end portion of the first conductor pattern, and has a height that is gradually changed.

11. The touch panel according to claim 10, further comprising:
a fourth structure layer that is formed on the second resistive layer adjacently to the second end portion of the second conductor pattern, and has a height that is gradually changed.

12. The touch panel according to claim 11, further comprising:
a wiring substrate that is connected to the second end portion of the first conductor pattern and to the second end portion of the second conductor pattern.

13. The touch panel according to claim 1,
wherein the first end portion of the first conductor pattern is located on an opposite side to the first electrode.

14. A manufacturing method of a touch panel, comprising:
forming a first resistive layer on a first support that is transparent;
forming a second resistive layer on a second support that is transparent;
forming, on the first resistive layer by a screen printing method, a first conductor pattern including an electrode portion that extends in a first direction, and a first structure layer that is formed adjacently to a first end portion on one side of the first conductor pattern, the first structure layer extending above a planar surface of the first support and having a height above the first support that is gradually reduced in proportion to a distance from the first end portion;
forming, on the second resistive layer by the screen printing method, a second conductor pattern including a second electrode portion that extends in a second direction that intersects with the first direction; and
bonding the first support and the second support with each other by bonding a bonding layer between the first conductor pattern and the second conductor pattern such that the first structure layer is covered.

15. The manufacturing method of a touch panel according to claim 14,
wherein the forming of the first structure layer includes reducing a formation area in proportion to the distance from the first end portion of the first conductor pattern.

16. The manufacturing method of a touch panel according to claim 14, further comprising:
forming, when forming of the second conductor pattern, a second structure layer on the second resistive layer by the screen printing method so that the second structure layer is adjacent to a first end portion on one side of the second conductor pattern and has a height that is gradually reduced in proportion to a distance from the first end portion.

17. The manufacturing method of a touch panel according to claim 14, further comprising:
forming, when forming of the first conductor pattern, a third structure layer on the first resistive layer by the screen printing method so that the third structure layer is adjacent to the second end portion on the other side of the first conductor pattern and has a height that is gradually changed.

18. The manufacturing method of a touch panel according to claim 14, further comprising:
forming, when forming of the second conductor pattern, a fourth structure layer on the second resistive layer by the screen printing method so that the fourth structure layer is adjacent to the second end portion on the other side of the second conductor pattern and has a height that is gradually changed.

19. The touch panel according to claim 1, wherein the first structure layer includes intervals that are configured to be gradually longer in proportion to a distance from the first conductor pattern first end portion.

20. A touch panel, comprising:
a first support that is transparent;
a second support that is transparent;
a first resistive layer formed on the first support;
a second resistive layer formed on the second support;
a first conductor pattern including a first electrode portion that extends in a first direction, and a first conductor pattern first end portion and a first conductor pattern second end portion opposite thereto, the first conductor pattern being formed on the first resistive layer;
a second conductor pattern including a second electrode portion that extends in a second direction that intersects with the first direction, and a second conductor pattern first end portion and a second conductor pattern second end portion opposite thereto, the second conductor pattern being formed on the second resistive layer;

a first structure layer that is formed on the first resistive layer adjacent to the first conductor pattern first end portion;

a second structure layer that is formed on the second resistive layer adjacent to the second conductor pattern first end portion; and a bonding layer including a first bonding surface that covers the first conductor pattern and the first structure layer and a second bonding surface that covers the second conductor pattern, wherein the first structure layer includes a plurality of structures that are intermittently formed to an outer distance of the first resistive layer from the first conductor pattern first end portion by a screen printing method, the plurality of structures having a height that is gradually reduced in proportion to the distance from the first conductor pattern first end portion, and the second structure layer includes a second plurality of structures that are intermittently formed to a second outer distance of the second resistive layer from the second conductor pattern first end portion by the screen printing method, the second plurality of structures having a height that is gradually reduced in proportion to the second distance from the second conductor pattern first end portion.

21. A manufacturing method of a touch panel, comprising:

forming a first resistive layer on a first support that is transparent;

forming a second resistive layer on a second support that is transparent;

forming, on the first resistive layer by a screen printing method, a first conductor pattern including an electrode portion that extends in a first direction, and a first structure layer that is formed adjacently to a first end portion on one side of the first conductor pattern;

forming, on the second resistive layer by the screen printing method, a second conductor pattern including a second electrode portion that extends in a second direction that intersects with the first direction, and a second structure layer that is formed adjacently to a second end portion on one side of the second conductor pattern; and bonding the first support and the second support with each other by bonding a bonding layer between the first conductor pattern and the second conductor pattern such that the first structure layer is covered, wherein the formed first structure layer includes a plurality of structures that are intermittently formed to an outer distance of the first resistive layer from the first end portion, the plurality of structures having a height that is gradually reduced in proportion to the distance from the first end portion, the formed second structure layer includes a second plurality of structures that are intermittently formed to a second outer distance of the second resistive layer from the second end portion, the second plurality of structures having a height that is gradually reduced in proportion to the second distance from the second end portion.

* * * * *